(12) United States Patent  
Gunna et al.

(10) Patent No.: US 9,280,352 B2  
(45) Date of Patent: Mar. 8, 2016

(54) LOOKAHEAD SCANNING AND CRACKING OF MICROCODE INSTRUCTIONS IN A DISPATCH QUEUE

(75) Inventors: Ramesh B. Gunna, San Jose, CA (US); Peter J. Bannon, Concord, MA (US); Rajat Goel, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 606 days.

(21) Appl. No.: 13/307,969

(22) Filed: Nov. 30, 2011

(65) Prior Publication Data

US 2013/0138924 A1 May 30, 2013

(51) Int. Cl.
  G06F 9/22 (2006.01)
  G06F 9/28 (2006.01)
  G06F 9/38 (2006.01)
  G06F 9/30 (2006.01)

(52) U.S. Cl.
  CPC ............... *G06F 9/3836* (2013.01); *G06F 9/22* (2013.01); *G06F 9/28* (2013.01); *G06F 9/3017* (2013.01); *G06F 9/3814* (2013.01)

(58) Field of Classification Search
  CPC .................................... G06F 9/22; G06F 9/28
  USPC ........................................................ 712/245
  See application file for complete search history.

(56) References Cited

U.S. PATENT DOCUMENTS

| | | | |
|---|---|---|---|
| 5,796,973 A * | 8/1998 | Witt et al. ..................... | 712/208 |
| 5,968,163 A | 10/1999 | Narayan et al. | |
| 5,983,337 A * | 11/1999 | Mahalingaiah et al. ........ | 712/32 |
| 7,890,702 B2 | 2/2011 | Lauterbach | |
| 2003/0105946 A1 * | 6/2003 | Cornaby et al. .............. | 712/245 |
| 2008/0016323 A1 * | 1/2008 | Henry et al. .................. | 712/208 |

OTHER PUBLICATIONS

FIFO, Nov. 17, 2010, Wikipedia, pp. 1-4.*
David Williamson, ARM Cortex A8: A high performance processor for low power applications, Oct. 20, 2010, pp. 1-23.*
Shen and Lipasti, Modern Processor Design, Oct. 9, 2010, McGraw Hill, Beta, 4 pages.*

* cited by examiner

*Primary Examiner* — Andrew Caldwell  
*Assistant Examiner* — Jyoti Mehta  
(74) *Attorney, Agent, or Firm* — Rory D. Rankin; Meyertons, Hood, Kivlin, Kowert & Goetzel, P.C.

(57) ABSTRACT

An apparatus and method for avoiding bubbles and maintaining a maximum instruction throughput rate when cracking microcode instructions. A lookahead pointer scans the newest entries of a dispatch queue for microcode instructions. A detected microcode instruction is conveyed to a microcode engine to be cracked into a sequence of micro-ops. Then, the sequence of micro-ops is placed in a queue, and when the original microcode instruction entry in the dispatch queue is selected for dispatch, the sequence of micro-ops is dispatched to the next stage of the processor pipeline.

24 Claims, 9 Drawing Sheets

| Microcode Instruction | Micro-Ops |
|---|---|
| 20 | 44 |
| | 46 |
| | 48 |
| | 50 |
| ⋮ | ⋮ |

Microcode Table 42

*FIG. 2*

LOOKAHEAD SCANNING AND CRACKING OF MICROCODE INSTRUCTIONS IN A DISPATCH QUEUE

BACKGROUND

1. Field of the Invention

The present invention relates generally to processors, and in particular to methods and mechanisms for handling microcode instructions in a processor pipeline.

2. Description of the Related Art

Microcode instructions are used by some processors to perform specialized routines. The term "microcode" may be defined as hardware-level instructions and/or data structures involved in the implementation of higher level operations. A microcode instruction may also be defined as a complex instruction. Microcode may also refer to instructions in an instruction set architecture that are not directly executable by an execution unit of the processor and therefore may require additional translation before being executed. Microcode instructions may be translated, or "cracked", into a sequence of circuit-level operations that are stored in a memory (e.g., read-only memory (ROM)), via one or more table look-up operations. The cracked operations may be referred to variously as "micro-operations", "micro-ops", or "uops".

In a standard operation, a processor detects a microcode instruction in the pipeline, the microcode instruction is cracked into a sequence of micro-ops suitable for execution by an execution unit, and then the micro-ops are dispatched to the next stage in the pipeline. Generally speaking, a processor pipeline comprises a plurality of pipeline stages in which various portions of processing are performed. Typically, the entry and exit points for cracking microcode instructions introduce "bubbles" (i.e., cycles when no productive operations are being performed) into the pipeline. These bubbles may delay the execution of subsequent instructions and negatively impact overall processor performance. The bubbles may also prevent the processor from maintaining a maximum instruction throughput rate.

SUMMARY

In one embodiment, an apparatus may include a dispatch queue and a microcode engine. The dispatch queue may receive decoded instructions from a decode unit. In one embodiment, the dispatch queue may be a first-in-first-out (FIFO) queue. The dispatch queue may include one or more read pointers to read, schedule, and generally manage the instructions stored in the dispatch queue. The dispatch queue may also include one or more lookahead pointers to scan the dispatch queue for microcode instructions.

When a lookahead pointer encounters a microcode instruction, the lookahead pointer may convey the microcode instruction to the microcode engine. The microcode engine may crack the microcode instruction into one or more micro-ops and then place the micro-op(s) in a microcode output queue. The micro-op(s) may be stored in the microcode output queue until the original microcode instruction is scheduled for dispatch from the dispatch queue. When the original microcode instruction is scheduled for dispatch from the dispatch queue, the micro-ops from the microcode output queue may be dispatched to the next stage of the processor pipeline in the place of the original microcode instruction. In one embodiment, up to three micro-ops may be packed together into a payload and dispatched in a single clock cycle. If there are fewer than three micro-ops stored in the microcode output queue, simple instructions may be packed into the same payload and dispatched with the micro-ops.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 2 is a microcode table in accordance with one or more embodiments.

DETAILED DESCRIPTION OF EMBODIMENTS

Figure 1:
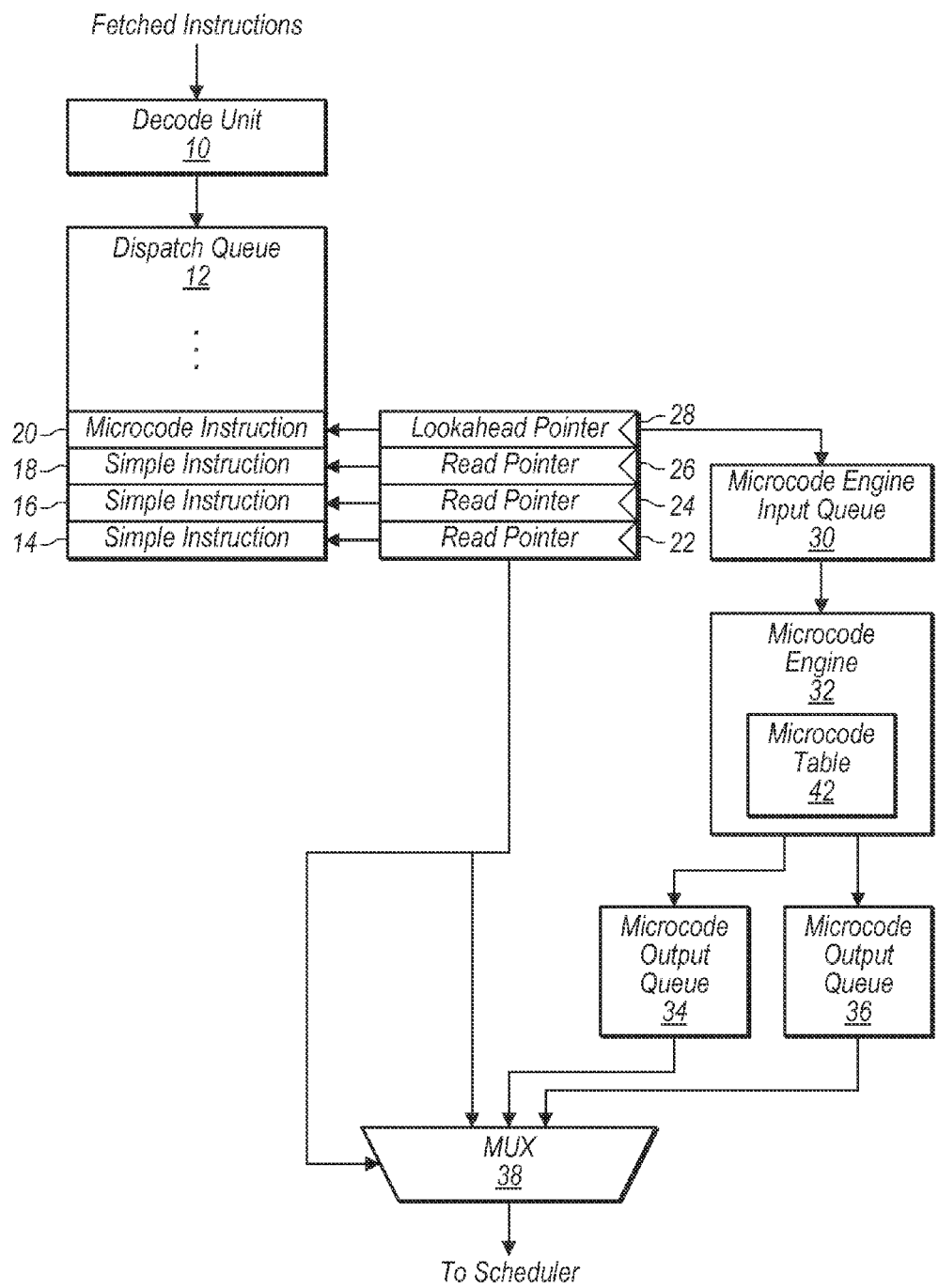
FIG. 1 is a block diagram that illustrates one embodiment of a portion of a processor pipeline.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a cache . . . " Such a claim does not foreclose the processor from including additional components (e.g., a network interface, a crossbar).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a dispatch queue storing five instructions, the terms "first" and "second" instructions can be used to refer to any two of the five instructions.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of a processor pipeline is shown. The portion of the processor pipeline shown in FIG. 1 include a decode unit 10, dispatch queue 12, read pointers 22, 24, and 26, lookahead pointer 28, microcode input queue 30, microcode engine 32, microcode output queues 34 and 36, and multiplexer (mux) 38. It is noted that the overall (entire) processor pipeline may also include many other stages (e.g., fetch unit, scheduler, execution units, load/store unit), both preceding decode unit 10 and following mux 38, not shown in FIG. 1. These other stages may include additional logic and various other components. In various embodiments, the processor pipeline may be incorporated within a processor, and the processor may be included within a system on chip (SoC), an application specific integrated circuit (ASIC), an apparatus, or any of various other devices.

Decode unit 10 may decode instructions received from a fetch unit (not shown) and decode unit 10 may convey the decoded instructions to dispatch queue 12. Instructions received from decode unit 10 may be queued in dispatch queue 12, including instructions 14, 16, 18, and 20, which are representative of any number of instructions which may be stored in dispatch queue 12. In one embodiment, each instruction of instructions 14-18 and 20 may include an operand portion and a status bit. In various embodiments, instructions may also be referred to as "operations" or "operands". The status bit may indicate whether or not an instruction in the entry is a microcode instruction. In other embodiments, other indicators may be utilized to specify whether an instruction is a microcode instruction. In addition, instructions 14-18 and 20 may include other information, indicators, and status bits, in addition to an operand value. It is further noted that in other embodiments, dispatch queue 12 may include additional information and may be organized in any suitable manner.

In one embodiment, the decoded instructions may be classified into different categories, such as microcode instructions and simple instructions. A "simple instruction", also referred to variously as a "non-complex instruction" or "directly-decoded instruction", may be defined as an instruction that is directly executable by an execution unit. In contrast, a "microcode instruction" may be defined as an instruction that is not directly executable by an execution unit. The microcode instruction may be cracked into one or more micro-ops, and the micro-ops may be executable by an execution unit.

In one embodiment, decode unit 10 may convey up to four instructions per clock cycle to dispatch queue 12. In other embodiments, decode unit 10 may convey other numbers of instructions per clock cycle to dispatch queue 12. Decode unit 10 may identify microcode instructions and decode unit 10 may convey an indicator (e.g., a status bit) along with each decoded instruction to dispatch queue 12 so that dispatch queue 12 may be able to identify which instructions are microcode instructions. One or more write pointers (not shown) may be configured to write instructions from decode unit 10 to dispatch queue 12.

The depth of dispatch queue 12 may vary from embodiment to embodiment. In one embodiment, dispatch queue 12 may be a first-in-first-out (FIFO) queue. In another embodiment, dispatch queue 12 may be another type of queue structure. Dispatch queue 12 may receive instructions from decode unit 10, and dispatch queue 12 may store the instructions while they are waiting to be scheduled for dispatch. Instructions dispatched from dispatch queue 12 may be conveyed to mux 38. In one embodiment, instructions may be dispatched from dispatch queue 12 in the order in which they are received from decode unit 10. Dispatch queue 12 may include logic for keeping track of stored instructions and for determining when to schedule stored instructions for dispatch. In one embodiment, instructions may be selected and scheduled for dispatch by read pointers 22-26. Read pointers 22-26 are representative of any number of read pointers configured to point to and access instructions within dispatch queue 12.

Dispatch queue 12 and microcode output queues 34 and 36 are coupled to multiplexer 24. Instructions from dispatch queue 12 and/or microcode output queues 34 and 36 may be packed into dispatch payloads, and the payloads may be forwarded to the next stage of the processor pipeline via mux 38. In one embodiment, the next stage in the processor pipeline may be a scheduler. In another embodiment, the next stage in the processor pipeline may be a mapper. In a further embodiment, the next stage may be any of various other units.

In one embodiment, dispatch queue 12 may store instructions that make up a program sequence. Microcode instructions later in the program sequence may be prefetched into microcode engine 32 while the dispatch queue is dispatching instructions from an earlier point in the program sequence. Then, microcode engine 32 may crack each prefetched microcode instruction into one or more micro-ops. In this way, micro-ops will already be preloaded and ready in microcode output queues 34 or 36 by the time the dispatch queue 12 selects the original microcode instruction for dispatch. When dispatch queue 12 selects the original microcode instruction for dispatch, the micro-ops in microcode output queue 34 or 36 may be dispatched in place of the original microcode instruction.

Lookahead pointer 28 is representative of any number of lookahead pointers which may be utilized to scan the entries of dispatch queue 12 for any microcode instructions. In other embodiment, other types of lookahead mechanisms may be utilized to scan dispatch queue 12. When lookahead pointer 28 encounters a microcode instruction, lookahead pointer 28 may write the instruction into microcode engine input queue 30. The original entry for instruction 34 may stay in dispatch queue 12, and when the original entry for instruction 34 is scheduled for dispatch, the corresponding micro-ops, cracked by microcode engine 32 and stored in microcode output queue 34 or 36, may be dispatched in place of the original entry. In one embodiment, lookahead pointer 28 may include status flags associated with dispatch queue 12. Lookahead pointer 28 may know where the oldest entry is in the dispatch queue based on the status flags, and then lookahead pointer 28 may look ahead from that point and scan the newer entries of dispatch queue 12 for any microcode instructions. In this way, lookahead pointer 28 may stay ahead of microcode instructions coming down the pipeline and prevent bubbles in the flow of dispatched instructions. Generally speaking, an instruction is younger or newer than another instruction if it is subsequent to the other instruction in program order. An instruction is older than another instruction if the instruction is prior to the other instruction in program order.

Microcode engine input queue 30 may be utilized to receive and store microcode instructions prior to the microcode instructions being conveyed to microcode engine 32. In one embodiment, queue 30 may have a depth of three, although in other embodiments, the depth of queue 30 may vary. In another embodiment, lookahead pointer 28 may convey microcode instructions directly to microcode engine 32.

Microcode engine 32 may receive microcode instructions from queue 30, and microcode engine 32 may be configured to crack each of the received microcode instructions into a microcode routine of one or more micro-ops. Microcode routines may be stored within any suitable type of control store. In various embodiments, microcode engine 32 may include and/or be coupled to a memory (e.g., ROM, programmable logic array (PLA) structure) (not shown) for storing one or more microcode tables (e.g., microcode table 42). A plurality of microcode instructions may be defined for a particular processor, and for each potential microcode instruction, microcode table 42 may store a predefined sequence of micro-ops, which may be read from table 42 when given the corresponding microcode instruction.

Microcode engine 32 may be configured to forward micro-ops to microcode output queues 34 and 36. Microcode output queues 34 and 36 are representative of any number of queues which may be utilized to store micro-ops. Queues 34 and 36 may be coupled to mux 38, and mux 38 may select between queues 34 and 36 and dispatch queue 12 for dispatching instructions to the next stage of the pipeline. In one embodiment, the depth of microcode output queues 34 and 36 may be three for storing up to three micro-ops. In other embodiments, the depth of microcode output queues 34 and 36 may vary.

Read pointers 22, 24, and 26 may be configured to point to the three oldest entries (instructions 14, 16, and 18) in dispatch queue 12. Read pointers 22-26 are representative of any number of read pointers which may be utilized to schedule and dispatch entries of dispatch queue 12. Read pointers 22-26 may be configured to schedule the instructions for dispatch from dispatch queue 12, and read pointers 22-26 may be incremented to point to newer instructions in dispatch queue 12 as older instructions are dispatched.

Read pointers 22-26 may also be configured to provide the select signal to mux 38, effectively selecting from which path to dispatch instructions to the next stage of the pipeline. When selecting from microcode output queue 34 or 36, read pointers 22-26 may determine how to pack the output payload based on the number of micro-ops stored in queue 34 or 36. In one embodiment, in a single clock cycle, read pointers 22-26 may select multiple instructions from dispatch queue 12 and/or multiple micro-ops from microcode output queues 34 and 36 for inclusion in a payload to be dispatched to the next stage of the pipeline. For example, in one embodiment, read pointers 22-26 may be configured to dispatch three instructions and/or micro-ops per clock cycle from dispatch queue 12 and/or microcode output queues 34 and 36.

In one embodiment, microcode engine 32 may generate up to three micro-ops per clock cycle. For illustrative purposes, in one example, a particular microcode instruction may be cracked into a total of eight micro-ops. Microcode engine 32 may generate the first three micro-ops in a first clock cycle, the next three micro-ops in a second clock cycle, and the final two micro-ops in a third clock cycle. In one embodiment, microcode engine 32 may wait until receiving a status flag indicating that the previously generated micro-ops have been consumed before generating more micro-ops. Other microcode instructions corresponding to other numbers of micro-ops may be cracked into micro-ops in a similar fashion, with a maximum of three micro-ops generated per clock cycle. In other embodiments, microcode engine 32 may generate more than three micro-ops per clock cycle.

In another embodiment, microcode engine 32 may crack multiple microcode instructions in parallel in a single clock cycle. For example, multiple lookahead pointers may simultaneously identify multiple microcode instructions. The lookahead pointers may convey the microcode instructions to microcode engine 32 (in one embodiment, via one or more microcode engine input queues) and microcode engine 32 may simultaneously crack each microcode instruction into one or more micro-ops. Microcode engine 32 may convey each sequence of micro-ops, corresponding to a different original microcode instruction, into a separate microcode output queue.

In one embodiment, if the oldest selected entry in dispatch queue 12 is a microcode instruction, the corresponding micro-ops may be pulled out of microcode output queue 34 or 36 and dispatched to the next stage of the pipeline. If the three oldest entries in dispatch queue 12 are simple instructions, dispatch queue 12 may dispatch the three simple instructions in one clock cycle. In a similar fashion up to three micro-ops may be packed together into a payload and dispatched to the next pipeline stage in a single clock cycle. In other embodiments, more than three instructions may be packed into a payload and dispatched in a single clock cycle.

In one embodiment, the operation of lookahead pointer 28 may be determined based on the status of microcode engine input queue 30, microcode engine 32, and microcode output queues 34 and 36. In this embodiment, microcode engine input queue 30 may be monitored to determine if any microcode instructions are stored in queue 30. Also, microcode engine 32 may be monitored to determine if a microcode instruction is currently being cracked. In addition, microcode output queues 34 and 36 may be monitored to determine if any micro-ops are stored in queues 34 and 36. If the microcode engine input queue 30 is empty, if microcode engine 32 is not busy, and/or if microcode output queues 34 and 36 are empty, then lookahead pointer 28 may scan younger entries in dispatch queue 12 for microcode instructions. In various embodiments, lookahead pointer 28 may base its operation on the status of any one of the above conditions, any two of the above conditions, or all three of the above conditions. In these embodiments, lookahead pointer 28 may wait until microcode engine 32 is available to process microcode instructions before searching for new microcode instructions in dispatch queue 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Turning now to FIG. 2, one embodiment of a microcode table is shown. Microcode table 42 may be stored in a memory (e.g., ROM) and may be utilized by a microcode engine to crack a microcode instruction into corresponding micro-ops. The number of micro-ops per microcode instruction may vary from instruction to instruction.

In one embodiment, microcode table 42 may include any number of entries for any number of microcode instructions. In another embodiment, a microcode engine may utilize a plurality of microcode tables for cracking microcode instructions. As shown in FIG. 2, microcode instruction 20 may be cracked into micro-ops 44, 46, 48, and 50. This is for illustrative purposes only, and other microcode routines stored in microcode table 42 for other microcode instructions may have other numbers of micro-ops.

In one embodiment, when a microcode engine receives microcode instruction 20, the engine may access table 42 to generate micro-ops 44, 46, and 48 in a first clock cycle, and the microcode engine may generate micro-op 50 in a second clock cycle. In one embodiment, the second clock cycle may be the clock cycle immediately following the first clock cycle. In another embodiment, the microcode engine may wait until micro-ops 44, 46, and 48 are consumed before generating micro-op 50.

Figure 3:
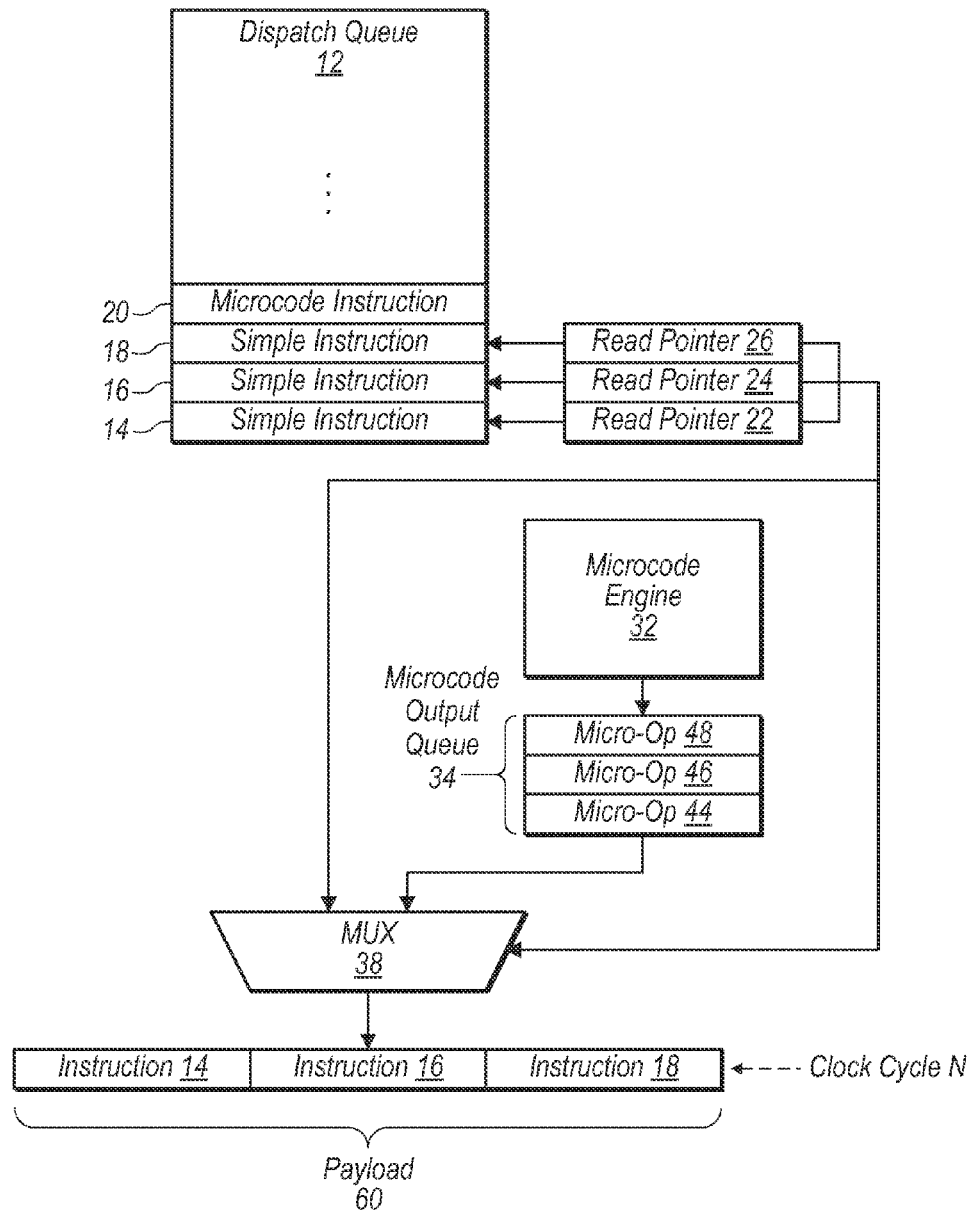
FIG. 3 is a block diagram that illustrates the generation of a dispatch payload in accordance with one or more embodiments.

Referring now to FIG. 3, a block diagram of one embodiment of a dispatch queue and a microcode engine is shown. Dispatch queue 12 may include a plurality of instruction entries, and as shown in FIG. 3, the oldest entry may be simple instruction 14, followed by simple instruction 16 as the next oldest entry, and followed by simple instruction 18 as the third oldest entry.

It is assumed for the purpose of this discussion that microcode instruction 20 was detected in dispatch queue 12 by a lookahead pointer (not shown) during an earlier clock cycle. In one embodiment, after being detected, microcode instruction 20 may have been cracked by microcode engine 32 into micro-ops 44, 46, and 48 during a previous clock cycle. In another embodiment, microcode engine 32 may crack microcode instruction 20 in the current clock cycle N.

When read pointers 22-26 point to simple instructions 14-18, respectively, in dispatch queue 12, the select signal coupled to mux 38 may select instructions 14-18 to be the output of mux 38. For the current clock cycle (i.e., clock cycle N), simple instructions 14, 16, and 18 may be packed into a single payload 60 and dispatched to the next stage (not shown) of the processor pipeline. Payload 60 is shown in FIG. 3 as containing three instructions, but this is for illustrative purposes only. In other embodiments, other numbers of instructions (simple and/or micro-ops) may be packed into a single payload.

Figure 4:
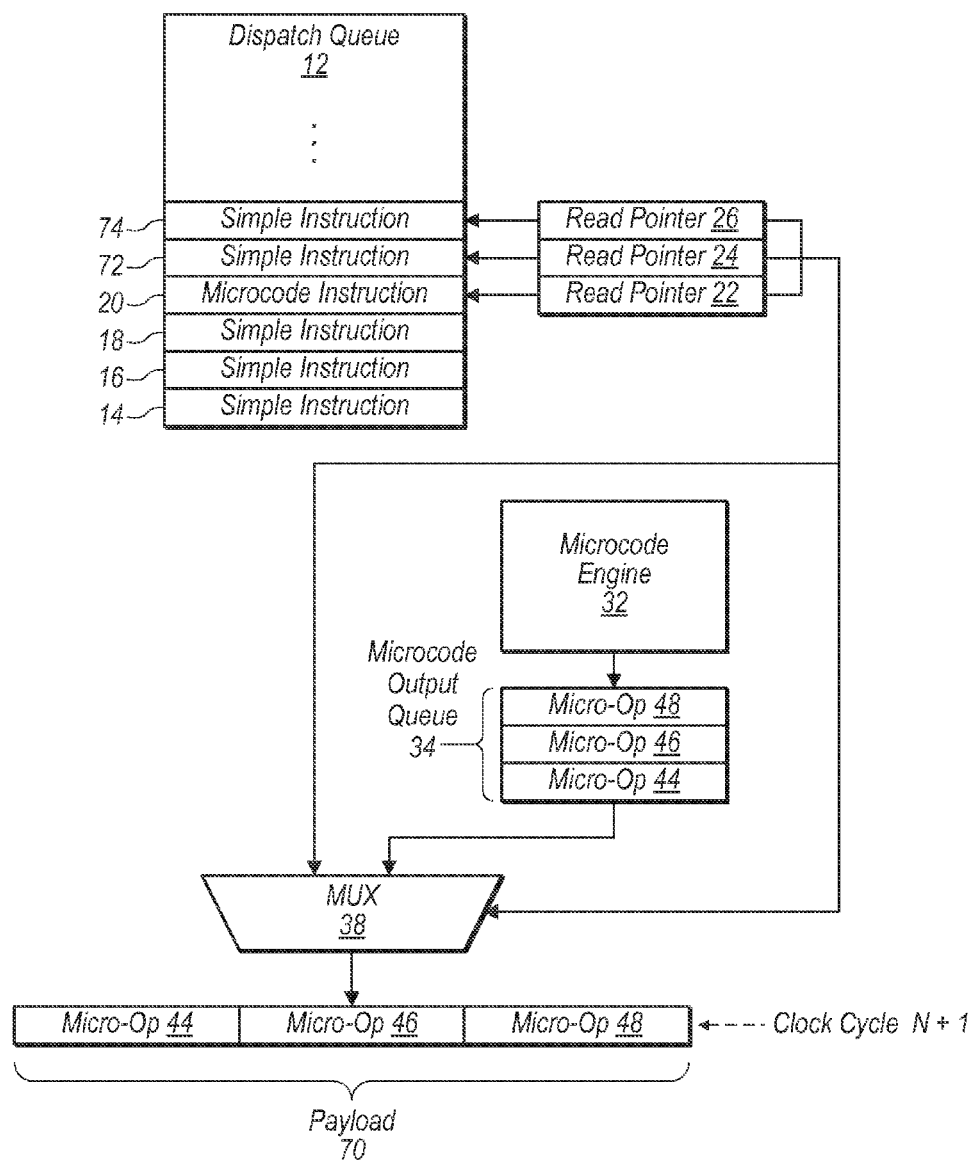
FIG. 4 is a block diagram that illustrates the generation of a dispatch payload in a subsequent clock cycle in accordance with one or more embodiments.

Turning now to FIG. 4, a block diagram of one embodiment of a dispatch queue and a microcode engine in a subsequent clock cycle is shown. For illustrative purposes, FIG. 4 shows the operation during clock cycle N+1. FIG. 4 is a continuation of the illustration shown in FIG. 3. Whereas FIG. 3 depicts an instruction payload being dispatched to the next stage of the processor pipeline during clock cycle N, FIG. 4 shows the next instruction payload being dispatched in the subsequent clock cycle N+1.

It is assumed for the purpose of this discussion that microcode instruction 20 has already been cracked by microcode engine into micro-ops 44, 46, and 48. It is also assumed that read pointers 22-26 have been incremented to point to microcode instruction 20 and simple instructions 72 and 74, respectively. Although shown in FIG. 4 despite having been dispatched in the previous clock cycle N, simple instructions 14-18 may be overwritten by new instructions received from decode unit 10 (not shown) in a subsequent clock cycle. Alternatively, simple instructions 14-18 may be overwritten by new instructions in the current clock cycle (N+1).

When read pointer 22 points to microcode instruction 20 in dispatch queue 12, the select signal coupled to mux 38 may couple microcode output queue 34 to the output of mux 38. For the current clock cycle N+1, micro-ops 44, 46, and 48 may be packed into a single payload 70 and dispatched to the next stage of the pipeline. It is noted that payloads 60 and 70 are dispatched in back-to-back clock cycles without any delays or bubbles necessitated by the cracking of microcode instruction 20.

Figure 5:
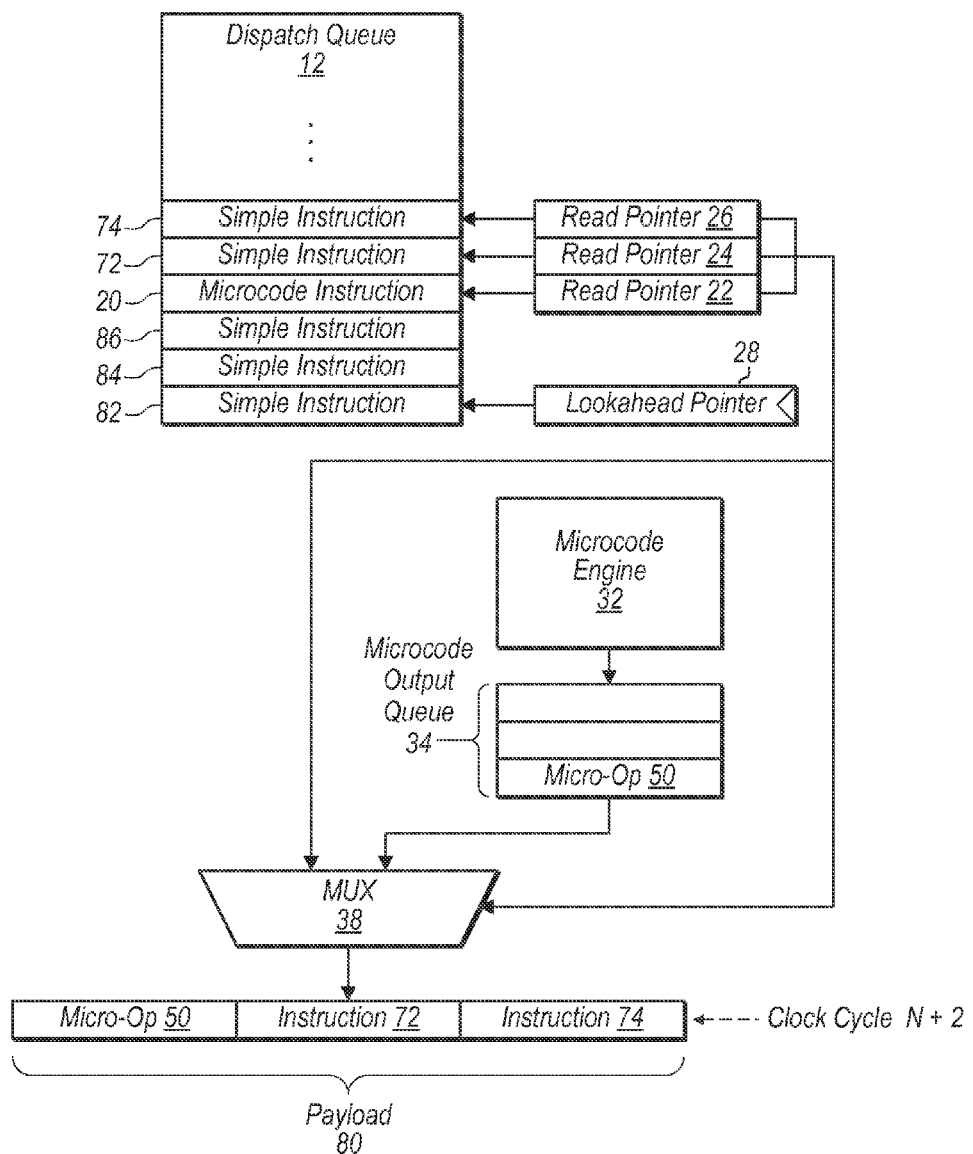
FIG. 5 is a block diagram that illustrates the generation of a dispatch payload in a subsequent clock cycle in accordance with one or more embodiments.

Referring now to FIG. 5, a block diagram of one embodiment of a dispatch queue and a microcode engine in a subsequent clock cycle is shown. For illustrative purposes, FIG. 5 shows the operation during clock cycle N+2. FIG. 5 is a continuation of the illustration shown in FIG. 4. Whereas FIG. 4 depicts an instruction payload being dispatched to the next stage of the processor pipeline during clock cycle N+1, FIG. 4 shows the next instruction payload being dispatched in the subsequent clock cycle N+2.

The micro-op 50 may have been written to microcode output queue 34 in the previous clock cycle (N+1) as the previous values from microcode output queue 34 were being written into payload 70 (of FIG. 4). Alternatively, in another embodiment, micro-op 50 may be stored and dispatched from microcode output queue 36 (of FIG. 1). In this embodiment, microcode output queue 36 may store micro-op 50 at the same time that microcode output queue 34 stores micro-ops 44-48.

After the first three micro-ops (micro-ops 44, 46, and 48) are dispatched in clock cycle N+1, micro-op 50 is the only remaining micro-op corresponding to microcode instruction 20 yet to be dispatched. Micro-op is placed into payload 80, and since there is still space remaining in payload 80 for additional instructions, the next two instructions from dispatch queue 12 (simple instructions 72 and 74) may be packed into payload 80 with micro-op 50, and then payload 80 may be dispatched to the next stage of the pipeline in clock cycle N+2. It is noted that payload 70 and payload 80 are dispatched in back-to-back clock cycles without any intervening bubbles.

In another embodiment, if microcode instruction 20 is followed by another microcode instruction, then the first two micro-ops (corresponding to the subsequent microcode instruction) may be packed into payload 80 with micro-op 50.

The first two micro-ops from the subsequent microcode instruction may be stored in another microcode output queue (not shown).

As shown in FIG. 5, simple instructions 82, 84, and 86 may be written to the dispatch queue 12 from decode unit 10 (not shown) in clock cycle N+2. Simple instructions 82-86 may overwrite the previously dispatched instruction entries of dispatch queue 12. Lookahead pointer 28 may scan the new instructions to determine if there are any microcode instructions that need to be cracked. In this instance, lookahead pointer 28 will not detect a microcode entry in the three new entries 82-86.

Figure 6:
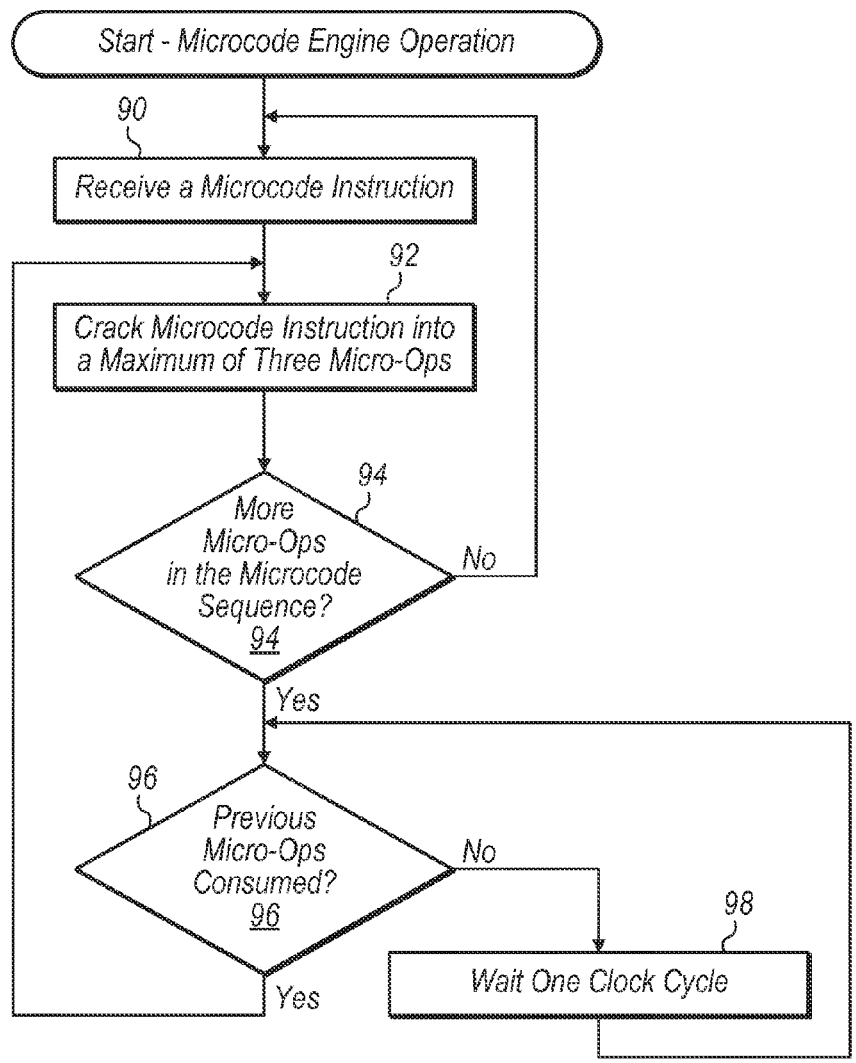
FIG. 6 is a generalized flow diagram illustrating one embodiment of a method for operating a microcode engine.

Turning now to FIG. 6, one embodiment of a method for operating a microcode engine is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a microcode instruction may be received by a microcode engine (block 90). In one embodiment, the microcode instruction may be conveyed from a dispatch queue to the microcode engine by a lookahead pointer. The microcode instruction may pass through a microcode input queue before being received by the microcode engine. The microcode engine may crack the microcode instruction into a maximum of three micro-ops per clock cycle (block 92). In other embodiments, the microcode engine may crack the microcode instruction into other numbers of micro-ops per clock cycle. The microcode engine may store the generated micro-ops in a micro-op output queue which may be coupled to a multiplexer.

The microcode engine may determine if there are additional micro-ops in the microcode sequence (conditional block 94). For example, a particular microcode instruction may correspond to a microcode sequence with more than three micro-ops, and it may take multiple clock cycles to generate all of the corresponding micro-ops. If there are more micro-ops in the microcode sequence (conditional block 94), then the microcode engine may determine if the previous micro-ops have been consumed (conditional block 96). If there are no more micro-ops in the microcode sequence (conditional block 94), then the microcode engine may wait to receive a new microcode instruction (block 90).

If the previously generated micro-ops have been consumed (conditional block 96), then the microcode engine may crack the microcode instruction into the next three micro-ops (block 92). If the previously generated micro-ops have not been consumed (conditional block 96), then the microcode engine may wait for one clock cycle (block 98). In other embodiments, the microcode engine may wait more than one clock cycle. After block 98, the microcode engine may again determine if the previously generated micro-ops have been consumed (conditional block 96).

Figure 7:
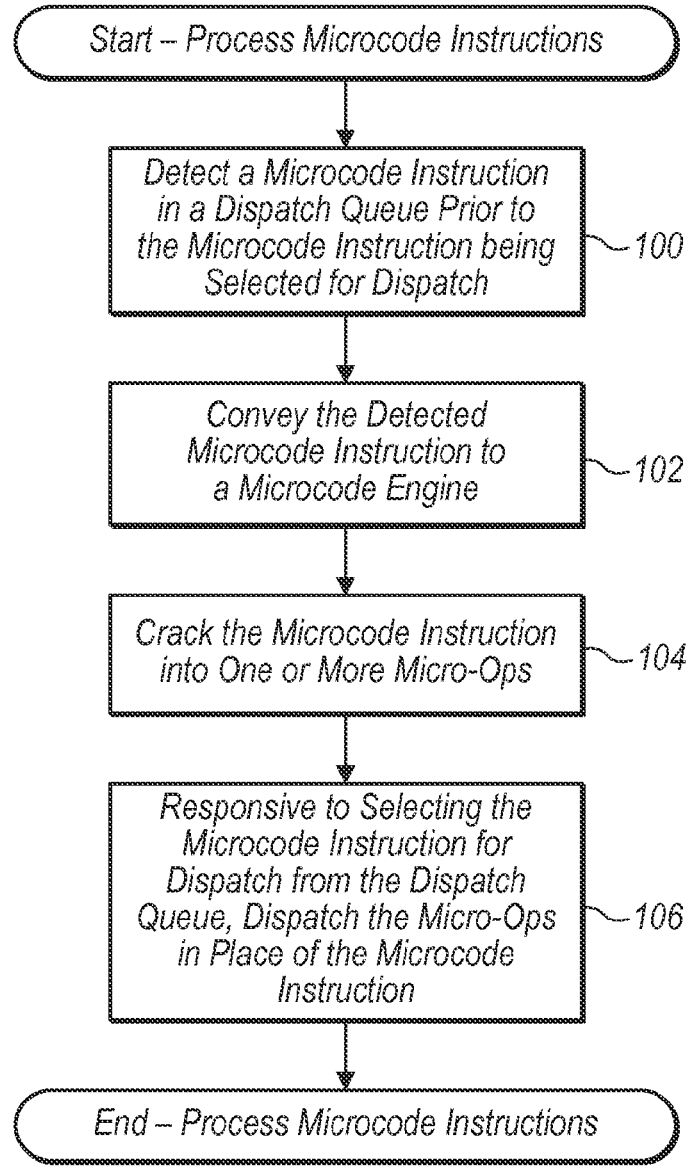
FIG. 7 is a generalized flow diagram illustrating one embodiment of a method for processing microcode instructions within a processor pipeline.

Turning now to FIG. 7, one embodiment of a method for processing microcode instructions within a processor pipeline is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A microcode instruction may be detected in a dispatch queue prior to the instruction being selected for dispatch (block 100). In one embodiment, a lookahead pointer may scan newer entries of the dispatch queue for microcode instructions. In other embodiments, other mechanisms may be utilized for detecting microcode instructions in the dispatch queue prior to the microcode instructions being scheduled for dispatch. If the lookahead pointer detects a microcode instruction, the detected microcode instruction may be conveyed to a microcode engine (block 102). The detected microcode instruction may also be retained in the dispatch queue after the instruction is conveyed to the microcode engine. In one embodiment, the detected microcode instruction may be conveyed to an input queue and then conveyed to the microcode engine from the input queue.

In one embodiment, the lookahead pointer may scan the dispatch queue responsive to determining the microcode engine is not currently cracking a microcode instruction and/or the input queue is empty. If the microcode engine is busy cracking a microcode engine and/or the input queue contains a microcode instruction, then the lookahead pointer may wait until the microcode engine is idle and/or the input queue is empty before scanning the dispatch queue for microcode instructions.

After block 102, the microcode instruction may be cracked into one or more micro-ops (block 104). The microcode instruction may be cracked by a microcode engine into the micro-ops in one or more clock cycles and stored in one or more microcode output queues. Then, responsive to selecting the microcode instruction for dispatch from the dispatch queue, the micro-ops may be dispatched in place of the microcode instruction (block 106). In one embodiment, the microcode output queues may be coupled to a multiplexer, and the micro-ops may be forwarded from a microcode output queue to the next stage of the processor pipeline through the multiplexer.

Figure 8:
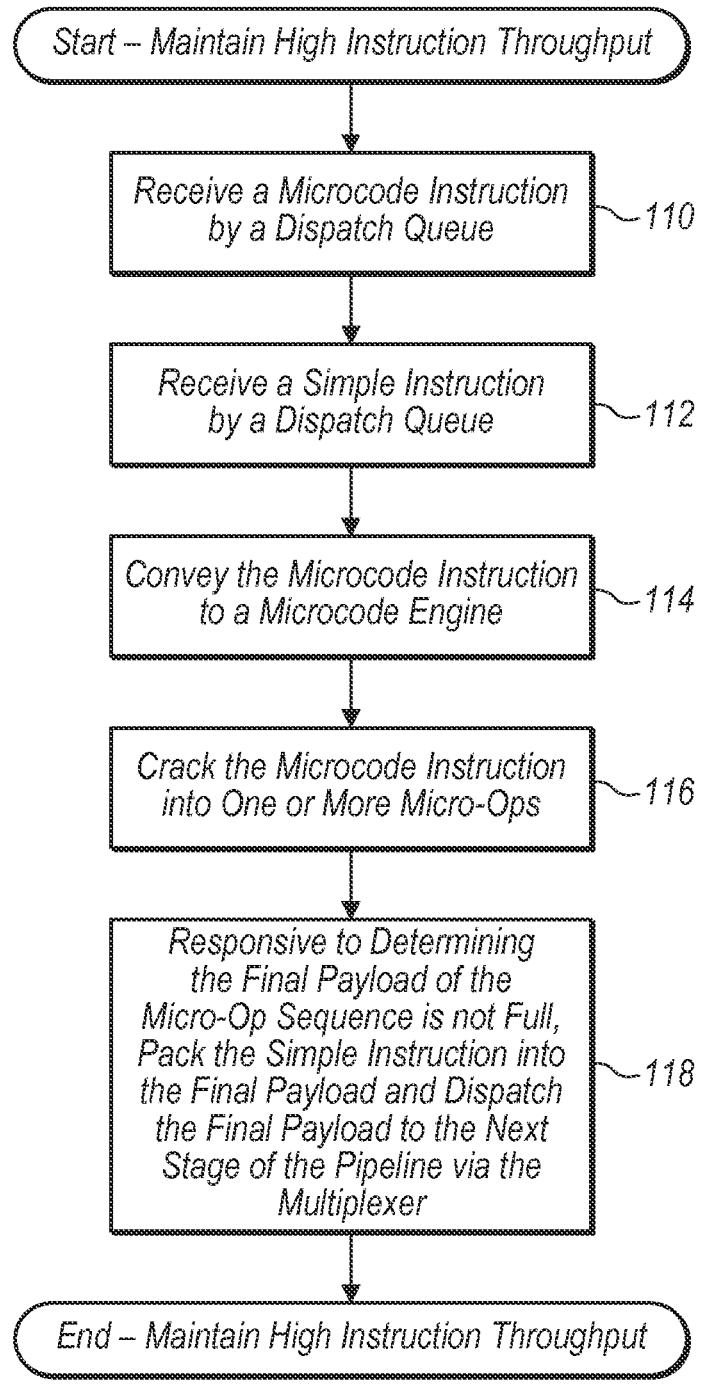
FIG. 8 is a generalized flow diagram illustrating one embodiment of a method for maintaining a high throughput of instructions in a dispatch queue.

Turning now to FIG. 8, one embodiment of a method for maintaining a high throughput of instructions in a dispatch queue is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A microcode instruction may be received by a dispatch queue (block 110). Next, a simple instruction may be received by the dispatch queue (block 112). The simple instruction may be received by the dispatch queue subsequent to the microcode instruction. In one embodiment, the microcode and simple instructions may be conveyed by a decode unit to the dispatch queue. The microcode instruction may be conveyed to a microcode engine (block 114). In some embodiments, the microcode instruction may be conveyed to the microcode engine prior to or at the same time the simple instruction is received by the dispatch queue.

Next, the microcode engine may crack the microcode instruction into one or more micro-ops (block 116). The microcode engine may crack the microcode instruction into the micro-ops over multiple clock cycles. For example, in one embodiment, the microcode engine may crack the microcode instruction into a maximum of three micro-ops per clock cycle. The microcode engine may convey the micro-ops to one or more microcode output queues, and the micro-ops may be conveyed from the microcode output queues to the next stage of the pipeline via a multiplexer. At the tail-end of the micro-op sequence, the microcode engine may generate less than a full dispatch width of micro-ops. Responsive to determining the final payload of the micro-op sequence is not full, the simple instruction may be packed into the final payload and dispatched to the next stage of the pipeline via the multiplexer (block 118).

Figure 9:
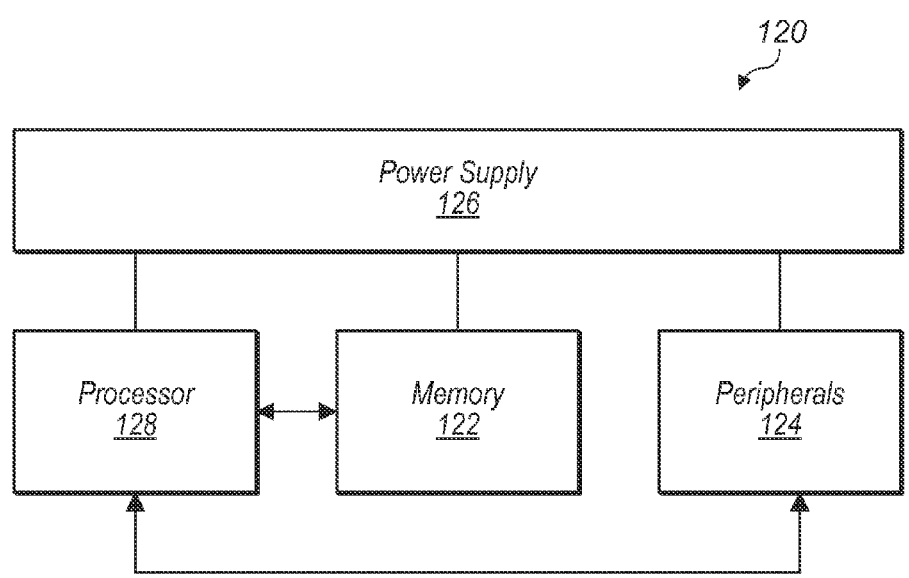
FIG. 9 is a block diagram of one embodiment of a system.

Referring now to FIG. 9, a block diagram of one embodiment of a system 120 is shown. In the illustrated embodiment, the system 120 includes at least one instance of a processor 128 coupled to peripherals 124 and memory 122. The processor 128 may include the portion of the processor pipeline shown in FIG. 1. A power supply 126 is also provided which supplies the supply voltages as well as one or more supply voltages to the processor 128, memory 122, and/or the peripherals 124. In other embodiments, more than one power supply 126 may be provided. In some embodiments, more than one instance of the processor 128 may be included (and more than one memory 122 may be included as well).

The memory 122 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

The peripherals 124 may include any desired circuitry, depending on the type of system 120. For example, in one embodiment, the system 120 may be a mobile device (e.g., personal digital assistant (PDA), smart phone, electronic reading device) and the peripherals 124 may include devices for various types of wireless communication, such as Wi-Fi, Bluetooth, cellular, global positioning system, etc. The peripherals 124 may also include additional storage, including RAM storage, solid state storage, or disk storage. The peripherals 124 may include user interface devices such as a display screen, including touch display screens or multitouch display screens, keyboard or other input devices, microphones, speakers, etc. In other embodiments, the system 120 may be any type of computing system (e.g., desktop personal computer, laptop, workstation, video game console, television, nettop).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a dispatch queue configured to store and dispatch decoded instructions to a scheduler;
   a microcode engine;
   a microcode engine input queue;
   one or more microcode output queues configured to store micro-ops generated by the microcode engine; and
   circuitry configured to:
     scan the dispatch queue for microcode instructions responsive to determining the microcode engine is not currently cracking a microcode instruction;
     scan the dispatch queue for microcode instructions responsive to determining the microcode engine input queue is empty;
     detect a given microcode instruction within the dispatch queue; and
     convey the given microcode instruction to the microcode engine prior to the given microcode instruction being ready for dispatch from the dispatch queue;
   wherein the microcode engine is configured to:
     crack the given microcode instruction into one or more micro-ops; and
     store the one or more micro-ops in a microcode output queue of the one or more microcode output queues;
   wherein in response to detecting a next instruction to be dispatched from the dispatch queue is the given microcode instruction, the one or more micro-ops are conveyed from the microcode output queue for execution.

2. The apparatus as recited in claim 1, wherein one or more instructions are selected from the dispatch queue to be dispatched.

3. The apparatus as recited in claim 2, further comprising a multiplexer, wherein the dispatch queue and the one or more microcode output queues are coupled as inputs to the multiplexer.

4. The apparatus as recited in claim 1, wherein in response to detecting the next instruction is not a microcode instruction, the next instruction is conveyed for execution.

5. The apparatus as recited in claim 4, further comprising circuitry configured to:
   detect a condition wherein a number of micro-ops stored in a given microcode output queue of the one or more microcode output queues is less than a maximum payload capacity; and
   responsive to detecting the condition, pack one or more subsequent simple instructions from the dispatch queue with one or more micro-ops from the given microcode output queue into a payload.

6. The apparatus as recited in claim 5, wherein the payload is dispatched via a multiplexer.

7. The apparatus as recited in claim 1, wherein each one of the decoded instructions comprises a status indicator, and wherein the status indicator is a single bit to indicate whether a corresponding decoded instruction is a microcode instruction.

8. The apparatus as recited in claim 1, wherein the dispatch queue is configured to receive decoded instructions from a decode unit.

9. An apparatus comprising:
   a dispatch queue comprising circuitry configured to select instructions for dispatch according to a plurality of read pointers;
   a microcode engine coupled to the dispatch queue;
   one or more microcode output queues coupled to the microcode engine;
   a microcode engine input queue;
   wherein the microcode engine is configured to:
     crack a microcode instruction from the dispatch queue into at least one micro-op prior to the microcode instruction being scheduled for dispatch; and
     store the at least one micro-op in a given microcode output queue; and
   circuitry configured to:
     monitor a status of the microcode engine input queue; and
     responsive to determining the microcode engine input queue is empty, scan the dispatch queue for microcode instructions.

10. The apparatus as recited in claim 9, further comprising a scheduler, wherein responsive to selecting the microcode instruction for dispatch, the given microcode output queue is configured to dispatch the at least one micro-op to the scheduler.

11. The apparatus as recited in claim 10, wherein the given microcode output queue is further configured to dispatch the at least one micro-op to the scheduler in at least one dispatch payload, and wherein a subsequent simple instruction is packed into a final dispatch payload with one or more micro-ops responsive to detecting the final dispatch payload of micro-ops is less than a maximum payload width.

12. The apparatus as recited in claim 9, further comprising:
   lookahead pointer circuitry coupled to the dispatch queue;
   wherein the microcode engine input queue is coupled to the microcode engine and the lookahead pointer circuitry.

13. The apparatus as recited in claim 9, wherein the dispatch queue is a first-in, first-out (FIFO) queue.

14. A method comprising:
   scanning a dispatch queue configured to store and dispatch decoded instructions including microcode instructions to a scheduler;
   scanning the dispatch queue for microcode instructions, responsive to determining a microcode engine input queue is empty;
   detecting a given microcode instruction within the dispatch queue;
   conveying the given microcode instruction to a microcode engine prior to the given microcode instruction being ready for dispatch from the dispatch queue;
   cracking the given microcode instruction into one or more micro-ops; and
   storing the one or more micro-ops in a microcode output queue of one or more microcode output queues;
   in response to detecting a next instruction to be dispatched from the dispatch queue is the given microcode instruction, conveying the one or more micro-ops from the microcode output queue for execution.

15. The method as recited in claim 14, wherein prior to detecting a microcode instruction in the dispatch queue, the method comprising scanning newer entries of the dispatch queue for microcode instructions.

16. The method as recited in claim 14, wherein in response to detecting the next instruction is not a microcode instruction, the next instruction is conveyed for execution.

17. The method as recited in claim 14, wherein conveying the one or more micro-ops comprises conveying the one or more micro-ops from the microcode output queue to a next stage of a processor pipeline via a multiplexer.

18. The method as recited in claim 14, wherein subsequent to conveying the given microcode instruction to the microcode engine, the given microcode instruction is also retained in the dispatch queue.

19. A method comprising:
   selecting instructions in a dispatch queue for dispatch according to a plurality of read pointers;
   cracking a microcode instruction received from the dispatch queue into at least one micro-op prior to the microcode instruction being scheduled for dispatch;
   storing the at least one micro-op in a given microcode output queue;
   monitoring a status of a microcode engine input queue; and
   responsive to determining the microcode engine input queue is empty, scanning the dispatch queue for microcode instructions.

20. The method as recited in claim 19, wherein responsive to selecting the microcode instruction for dispatch, the method comprises dispatching the at least one micro-op to a scheduler.

21. The method as recited in claim 20, wherein prior to cracking the microcode instruction into one or more micro-ops, the method comprising conveying the microcode instruction to a microcode engine.

22. The method as recited in claim 21, further comprising conveying the microcode instruction to the microcode engine input queue prior to conveying the microcode instruction to the microcode engine.

23. The method as recited in claim 19, further comprising dispatching the at least one micro-op to a scheduler in at least one dispatch payload, and packing a subsequent simple instruction into a final dispatch payload with one or more micro-ops responsive to detecting the final dispatch payload of micro-ops is less than a maximum payload width.

24. The method as recited in claim 23, wherein the microcode instruction is not directly executable by an execution unit, and wherein the subsequent simple instruction is directly executable by the execution unit.

* * * * *